US008301790B2

(12) United States Patent
Morrison et al.

(10) Patent No.: US 8,301,790 B2
(45) Date of Patent: Oct. 30, 2012

(54) SYNCHRONIZATION OF AUDIO AND VIDEO SIGNALS FROM REMOTE SOURCES OVER THE INTERNET

(76) Inventors: Randy Morrison, Henderson, NV (US); Lawrence Morrison, Austin, TX (US)

( * ) Notice: Subject to any disclaimer, the term of this patent is extended or adjusted under 35 U.S.C. 154(b) by 578 days.

(21) Appl. No.: 12/070,983

(22) Filed: Feb. 22, 2008

(65) Prior Publication Data

US 2009/0172200 A1 Jul. 2, 2009

(51) Int. Cl.
*G06F 15/16* (2006.01)
*G06F 1/12* (2006.01)
*G06F 13/42* (2006.01)
*G06F 15/177* (2006.01)
*H04L 7/00* (2006.01)

(52) U.S. Cl. ......... 709/231; 709/203; 709/204; 709/248

(58) Field of Classification Search .................. 709/231, 709/248, 230
See application file for complete search history.

(56) References Cited

U.S. PATENT DOCUMENTS 6,067,566 A 5/2000 Moline
6,462,264 B1 10/2002 Elam
6,710,815 B1 3/2004 Billmaier et al.
6,801,944 B2 10/2004 Motoyama et al.
6,891,822 B1 5/2005 Gubbi et al.
6,953,887 B2 10/2005 Nagashima et al.
7,050,462 B2 5/2006 Tsunoda et al.
7,072,362 B2 7/2006 Tsunoda et al.
7,127,496 B2 * 10/2006 Isozu et al. .................... 709/217
7,693,130 B2 * 4/2010 Barry et al. .................... 370/350
7,724,780 B2 * 5/2010 Baird et al. .................... 370/509
7,756,110 B2 * 7/2010 Factor et al. .................. 370/352
7,792,158 B1 * 9/2010 Cho et al. ...................... 370/518
7,835,336 B2 * 11/2010 Joung et al. ................... 370/342
8,028,097 B2 * 9/2011 Iwamura ....................... 709/248
8,041,980 B2 * 10/2011 Uehata .......................... 713/500
8,102,836 B2 * 1/2012 Jerlhagen et al. ............. 370/350
8,121,583 B2 * 2/2012 Przybysz et al. .............. 455/416
8,238,376 B2 * 8/2012 Iwamura ....................... 370/503
2002/0091834 A1 * 7/2002 Isozu et al. .................... 709/227
2004/0176168 A1 * 9/2004 Tsao et al. ...................... 463/42
2005/0144235 A1 * 6/2005 Bednall ......................... 709/206
2006/0002681 A1 * 1/2006 Spilo et al. ...................... 386/46
2006/0007943 A1 1/2006 Fellman
2006/0123976 A1 6/2006 Both et al.
2007/0140510 A1 * 6/2007 Redmann ....................... 381/97
(Continued)

FOREIGN PATENT DOCUMENTS

FR 2919775 A1 * 2/2009

OTHER PUBLICATIONS

Cox, D. et al. "Time Synchronization for ZigBee Networks," Proceedings of the 37th Southeastern Symposium on System Theory, Mar. 2005, pp. 135-138.*

(Continued)

*Primary Examiner* — Melvin H Pollack
(74) *Attorney, Agent, or Firm* — Thomas I. Rozsa

(57) ABSTRACT

The present invention is an architecture and technology for a method for synchronizing multiple streams of time-based digital audio and video content from separate and distinct remote sources, so that when the streams are joined, they are perceived to be in unison.

12 Claims, 4 Drawing Sheets

U.S. PATENT DOCUMENTS

| | | | | |
|---|---|---|---|---|
| 2007/0223675 | A1* | 9/2007 | Surin et al. | 379/202.01 |
| 2011/0299521 | A1* | 12/2011 | Shao et al. | 370/350 |
| 2012/0189074 | A1* | 7/2012 | Jin et al. | 375/267 |

OTHER PUBLICATIONS

Zhao, Ying et al. "Self-Adaptive Clock Synchronization Based on Clock Precision Difference," Proceedings of the 26th Australasian Computer Science Conference, vol. 16, 2003, pp. 181-187.*

Mills, D. "Simple Network Time Protocol (SNTP) Version 4 for IPv4, IPv6 and OSI," RFC 4330, Jan. 2006, pp. 1-27.*

Mills, David. "Network Time Protocol (Version 3) Specification, Implementation and Analysis," RFC 1305, Mar. 1992, pp. 1-96.*

Gowin, D. "NTP PICS PROFORMA for the Network Time Protocol Version 3," RFC 1708, Oct. 1994, pp. 1-13.*

Lee, Tsern-Huei et al. "Definition of Burstiness and Quantization for Delay Sensitive Traffic," Proceedings of the Fifteenth Annual Joint Conference of the IEEE Computer Societies, Networking the Next Generation, vol. 1, Mar. 28, 1996, pp. 377-383.*

Grossglauser, M. and Keshav, S. "On CBR Service," Proceedings of the 15th Annual Joint Conference of the IEEE Computer Societies, Networking the Next Generation, vol. 1, Mar. 28, 1996, pp. 129-137.*

* cited by examiner

SYNCHRONIZATION OF AUDIO AND VIDEO SIGNALS FROM REMOTE SOURCES OVER THE INTERNET

BACKGROUND OF THE INVENTION

1. Field of the Invention

The present invention relates to a method and system for synchronizing multiple signals received through different transmission mediums.

2. Description of the Prior Art

Synchronization systems are known in the prior art. The following eleven (11) patents and published patent applications are the closest prior art known to the inventor which are relevant to the present invention.

1. U.S. Pat. No. 6,067,566 issued to William A. Moline and assigned to Laboratory Technologies Corporation on May 23, 2000 for "Methods And Apparatus For Distributing Live Performances On Midi Devices Via A Non-Real-Time Network Protocol" (hereafter the "Moline Patent");

2. U.S. Pat. No. 6,462,264 issued to Carl Elam on Oct. 8, 2002 for "Method And Apparatus For Audio Broadcast Of Enhanced Musical Instrument Digital Interface (Midi) Data Formats For Control Of A Sound Generation To Create Music, Lyrics And Speech" (hereafter the "Elam Patent");

3. U.S. Pat. No. 6,710,815 issued to James A. Billmaier et al. and assigned to Digeo, Inc. on Mar. 23, 2004 for "Synchronizing Multiple Signals Received Through Different Transmission Mediums" (hereafter the "Billmaier Patent");

4. U.S. Pat. No. 6,801,944 issued to Satour Motoyama et al. and assigned to Yamaha Corporation on Oct. 5, 2004 for "User Dependent Control Of The Transmission Of Image And Sound Data In A Client-Server System" (hereafter the "Motoyama Patent");

5. U.S. Pat. No. 6,891,822 issued to Ralugopal R. Gubbi et al. and assigned to ShareWave, Inc. on May 10, 2005 for "Method And Apparatus For Transferring Isocronous Data Within A Wireless Computer Network" (hereafter the "Gubbi Patent");

6. U.S. Pat. No. 6,953,887 issued to Yoichi Nagashima et al. and assigned to Yamaha Corporation on Oct. 11, 2005 for "Session Apparatus, Control, Method Therefor, And Program For Implementing The Control Method" (hereafter the "Nagashima Patent");

7. United States Published Patent Application No. 2006/0002681 issued to Michael Spilo et al. on Jan. 5, 2006 for "Method And System For Synchronization Of Digital Media Playback" (hereafter the "Spilo Published Patent Application");

8. United States Published Patent Application No. 2006/0007943 issued to Ronald D. Fellman on Jan. 12, 2006 for "Method And System For Providing Site Independent Real-Time Multimedia Transport Over Packet-Switched Networks" (hereafter the "Fellman Published Patent Application");

9. U.S. Pat. No. 7,050,462 issued to Shigeo Tsunoda et al. and assigned to Yamaha Corporation on May 23, 2006 for "Real Time Communication Of Musical Tone Information" (hereafter the "'462 Tsunoda Patent");

10. United States Published Patent Application No. 2006/123976 issued to Christopher Both et al. on Jun. 15, 2006 for "System And Method For Video Assisted Music Instrument Collaboration Over Distance" (hereafter the "Both Published Patent Application");

11. U.S. Pat. No. 7,072,362 issued to Shigeo Tsunoda et al. and assigned to Yamaha Corporation on Jul. 4, 2006 for "Real Time Communications Of Musical Tone Information" (hereafter the "'362 Tsunoda Patent").

The Moline Patent is a method and apparatus for distributing live performances on MIDI devices via a non-real time network protocol. Techniques for distributing MIDI tracks across a network using non-real-time protocols such as TCP/IP. Included are techniques for producing MIDI tracks from MIDI streams as the MIDI streams are themselves produced and distributing the MIDI tracks across the network, techniques for dealing with the varying delays involved in the distributing the tracks using non-real-time protocols, and techniques for saving the controller state of MIDI track so that a user may begin playing the track at any point during its distribution across the network. Network services based on these techniques include distribution of continuous tracks of MIDI music for applications such as background music, distribution of live recitals via the network, and participatory music making on the network ranging from permitting the user to "play along" through network jam sessions to using the network as a distributed recording studio.

The detailed description of a preferred embodiment of the invention begins with an overview of the invention and then provides more detailed disclosure of the components of the preferred embodiment.

What is termed herein live MIDI is the distribution of a MIDI track from a server to one or more clients using a non-real-time protocol and the playing of the MIDI track by the clients as the track is being distributed. One use of live MIDI is to "broadcast" recitals given on MIDI devices as they occur. In this use, the MIDI stream produced during the recital is transformed into a MIDI track as it is being produced and the MIDI track is distributed to clients, again as it is produced, so that the clients are able to play the MIDI track as the MIDI stream is produced during the recital. The techniques used to implement live MIDI are related to techniques disclosed in the parent of the present patent application for reading a MIDI track 105 as it is received. These techniques, and related techniques for generating a MIDI track from a MIDI stream as the MIDI stream is received in a MIDI sequencer are employed to receive the MIDI stream, produce a MIDI track from it, distribute the track using the non-real-time protocol, and play the track as it is received to produce a MIDI stream. The varying delays characteristic of transmissions employing non real-time protocols are dealt with by waiting to begin playing the track in the client until enough of the track has been received that the time required to play the received track will be longer than the greatest delay anticipated in the transmission. Other aspects of the techniques permit a listener to being listening to the track at points other than the beginning of the track, and permit use of the non-real-time protocol for real-time collaboration among musicians playing MIDI devices.

The Elam Patent is a method and apparatus for audio broadcast of enhanced musical instrument digital interface (MIDI) data formats for control of a sound generator to create music, lyrics and speech. It specifically involves a method and apparatus for the transmission and reception of broadcasted instrumental music, vocal music, and speech using digital techniques. The data is structured in a manner similar to the current standards for MIDI data.

The Billmaier Patent which issued in 2004 is for synchronizing multiple signals received through different transmission mediums. Multiple signals received through different transmission mediums are synchronized within a set top box (STB) for subsequent mixing and presentation. Specifically, "FIG. 5 is a block diagram of various logical components of a system 500 for synchronizing a primary signal 402 with a secondary signal 404. The depicted logical components may be implemented using one or more of the physical components shown in FIG. 3. Additionally, or in the alternative, various logical components may be implemented as software modules stored in the memory 306 and/or storage device 310 and executed by the CPU 312.

In the depicted embodiment, a primary signal interception component 502 intercepts a primary signal 402 as it is received from the head-end 108. The primary signal interception component 502 may utilize, for example, the network interface 302 of FIG. 3 to receive the primary signal 402 from the head-end 108. The primary signal 402 may include encoded television signals, streaming audio, streaming video, flash animation, graphics, text, or other forms of content.

Concurrently, a secondary signal interception component 508 intercepts the secondary signal 404 as it is received from the head-end 108. As with the primary signal 402, the secondary signal 404 may include encoded television signals, streaming audio, steaming video, flash animation, graphics, text, or other forms of content. In one embodiment, the signal interception components 502, 508 are logical sub-components of a single physical component or software program.

Due to the factors noted above, reception of the secondary signal 404 may be delayed by several seconds with respect to the primary signal 402. Thus, if the secondary signal 404 were simply mixed with the unsynchronized primary signal 402, the results would be undesirable because the two are not synchronized.

Accordingly, a synchronization component 512 is provided to synchronize the primary signal 402 with the secondary signal 404. As illustrated, the synchronization component 512 may include or make use of a buffering component 514 to buffer the primary signal 402 for a period of time approximately equal to the relative transmission delay between the two signals 402, 404. As explained in greater detail below, the buffering period may be preselected, user-adjustable, and/or calculated."

Therefore, this invention discloses the concepts of synchronizing signals although they are not talking about more than two in this particular disclosure.

The Motoyama Patent is a user dependent control of the transmission of image and sound data in a client-server system. Specifically this patent discloses:

"Each user can select the rank in accordance with the performance of the client of the user, the degree of services to receive, an available amount of money paid to data reception, and the like. The rank is assigned to each user ID. The proxy server checks the rank form the user ID so that data matching the user rank can be supplied.

Each proxy server can detect its own load and line conditions. The main proxy server assigns each client a proxy server in accordance with the load and line conditions of each proxy server. A user can receive data from a proxy server having a light load and good line conditions so that a congested traffic of communications can be avoided and a communications delay can be reduced.

The main proxy server may detect a problem such as a failure to each proxy server in addition to the load and line conditions to change the connection of clients in accordance with the detected results. Even if some proxy server has a problem, this problem can be remedied by another proxy server.

When accessed by a client, the main proxy server 12 may assign the client any one of plurality of mirror servers 13. In this case, one of the mirror servers 13 transmits data to the client and the main proxy server 12 is not necessary to transmit data.

In the network shown in FIG. 1, the main server 7 is not always necessary. If the main server 7 is not used, the proxy server 12 or 13 becomes a server and which is not necessarily required to have a proxy function. In this case, the proxy servers 12 and 13 are not different from a general main server."

The Gubbi Patent is a method and apparatus for transferring isocronous data within a wireless computer network. It discloses:

"Also shown in FIG. 3 is an audio information buffer 74, which may also be a portion of memory 62 or one or more registers of processor 60. The audio information buffer 60 has several configurable thresholds, including an acute underflow threshold 76, a low threshold 78, a normal threshold 80, a high threshold 82 and an acute overflow threshold 84. The audio information buffer 74 is used in connection with the transfer of audio information from server 12 to the client unit 26 as follows.

In general, NIC 14 receives an audio stream from the host microprocessor 16 and, using the audio compression block 36, encodes and compresses that audio stream prior to transmission to the client unit 26. In one example, ADPCM coding may be used to provide a 4:1 compression ration. After transmission, client unit 26 may decompress and decode the audio information (e.g., using audio decompression unit 66) prior to playing out the audio stream to television 32. So, in order to ensure that these streams are synchronized, the audio information is time stamped at NIC 14 with respect to the corresponding video frame. This time stamp is meant to indicate the time at which the audio should be played out relative to the video. Then, at the client unit 26, the audio information is played out according to the time stamp so as to maintain synchronization (at least within a specified tolerance, say 3 frames).

Because, however, the host microprocessor 16 is unaware of this time stamping and synchronization scheme, a flow control mechanism must be established to ensure that sufficient audio information buffer 74, the client unit 26 can report back to the server 12 the status of available audio information. For example, ideally, the client unit 26 will want to maintain sufficient audio packets on hand to stay at or near the normal threshold 80 (which may represent the number of packets needed to ensure that proper synchronization can be achieved given the current channel conditions). As the number of audio packets deviates from this level, the client unit 26 can transmit rate control information to server 12 to cause the server to transmit more or fewer audio packets as required."

The Nagashima Patent which is assigned to Yamaha Corporation discloses a session apparatus, control method therefor, and program for implementing the control method. Specifically, the patent provides "there is provided a session apparatus that enables the user to freely start and enjoy a music session with another session apparatus without being restricted by a time the session should be started. A session apparatus is connected to at least one other session apparatus via a communication network in order to perform a music session with the other session apparatus. Reproduction data to be reproduced simultaneously with reproduction data received from the other session apparatuses is generated and transmitted to the other session apparatus. The reproduction data received from the other session apparatus is delayed by a period of time required for the received reproduction data to be reproduced in synchronism with the generated reproduction data, for simultaneous reproduction of the delayed reproduction data and the generated reproduction data."

The Spilo Patent is a method and system for synchronization of digital media. Specifically, synchronization is accomplished by a process which approximate the arrival time of a packet containing audio and/or video digital content across the network and instruct the playback devices as to when playback is to begin, and at what point in the streaming media content signal to begin playback. One method uses a time-stamp packet on the network to synchronize all players.

The Fellman Published Patent Application is for a method and system for providing site independent real-time multimedia transport over packet-switched networks. The patent discloses that site independence is achieved by measuring and accounting for the jitter and delay between a transmitter and receiver based on the particular path between the transmitter and receiver independent of site location. The transmitter inserts timestamps and sequence numbers into packets and then transmits from them. A receiver uses these timestamps to recover the transmitter's clock. The receiver stores the packets in a buffer that orders them by sequence number. The packets stay in the buffer for a fixed latency to compensate for possible network jitter and/or packet reordering. The combination of timestamp packet-processing, remote clock recovery and synchronization, fixed-latency receiver buffering, and error correction mechanisms help to preserve the quality of the received video, despite the significant network impairments generally encountered throughout the internet and wireless networks.

The '462 Tsunoda Patent discloses real time communications of musical tone information. Specifically, Column 2 of the patent beginning on Line 23 states:

"According to further aspect of the present invention, there is provided a communication system having a plurality of communications apparatuses each having receiving means and transmitting means, wherein: the receiving means of the plurality of communications apparatuses receive the same data; the transmitting means of the plurality of communications apparatuses can reduce the amount of data received by the receiving means and can transmit the reduced data; and the data reduced by one of the communications apparatuses is different form the data reduced by another of the communications apparatuses.

Since the data reduced by one and another of communications apparatuses is different, the quality of data transmitted from each communication apparatus is different. For example, the type or reduction factor of the reduced data may be made different at each communication apparatus. Therefore, a user can obtain data of a desired quality by accessing a proper communication apparatus.

According to still another aspect of the invention, there is provided a musical tone data communications method comprising the steps of: (a) transmitting MIDI data over a communications network; and (b) receiving the transmitted, the recovery data indicating a continuation of transmission of the MIDI data."

The Both Published Patent Application was published in June 2006. It discloses a system and method for video assisted music instrument collaboration over distance. Claim 1 reads as follows:

"A system for enabling a musician at one location to play a music instrument and have the played music recreated by a music instrument at another location, comprising:

at least first and second end points, the first end pont being connectable to the second end point through a data network, each end point comprising:

a music instrument capable of transmitting music data representing music played on the instrument and capable of receiving music played on the instrument and capable of receiving music data representing music to be played on the instrument;

a video conferencing system capable of exchanging video and audio information with the video conferencing system of another end point through the data network; and a music processing engine connected to the data network and the music instrument and having a user interface, the music processing engine being operable to receive music data from the instrument at the end point and to timestamp the receipt of the music data with a clock synchronized with end points in th system, to transmit the received music data with the timestamp to another end point in the system via the data network, to receive from the data network music data including timestamps from another end point and the buffer the received music data for a selected delay period and in the order indicated by the timestamps in the received music data and to forward the ordered music data, after the selected delay period to the music instrument connected to the end point to play the music represented by the music data."

The '362 Tsunoda Patent was issued in July 2006 and is assigned to Yamaha Corporation. For purposes of relevance, the same information quoted in the previous Tsunoda Patent is relevant to this Tsunoda Patent.

SUMMARY OF THE INVENTION

The present invention is an architecture and technology for a method for synchronizing multiple streams of time-based digital audio and video content from separate and distinct remote sources, so that when the streams are joined, they are perceived to be in unison.

An example of such sources would be several musicians, each in a different city, streaming music live onto the Internet. If two musicians are streaming their audio and video to a third musician or listener, the arrival time of their music will depend on their distance from the listener. This is because the streams are electronic in nature and so will travel at roughly the speed of light, which is constant for all observers. This means that the music of a nearby musician will arrive before the music of a more distant musician, even though they started playing at the same time. In order for the music to sound in unison, the streams of the nearby musician need to be buffered and delayed for the extra amount of time it takes the streams of the more distant musician to cover the extra distance.

Embodiments of the invention will utilize a standard time reference that all musicians will agree upon (Master Metronome) and utilize the Network Time Protocol (NTP) for communicating and synchronizing the time bases (metronomes) of each participating musician or listener. NTP is an Internet draft standard, formalized in RFC 958, 1305, and 2030.

The invention is to synchronize at least three signals so that they will arrive at the same time. The three clients (there can be any number of speakers in any number of different locations) log onto the server. When all individuals in the conference call are speaking, and are also using visual means so that they can be seen, a server will determine the network latencies of each client's stream by comparing the network time clocks as given by the network time protocol. The latency for each client will be roughly equal to the light travel time from the clients to the server. For example, if the client is 1,000 miles from the server the latency will be roughly 1,000/c (the speed of light) which equals 5.4 milliseconds.

Therefore, the concept is as follows. For the distances that are closer to the master client, the speed of transmission will be slowed down. For distances that are further from the master client, the transmission speed will be sped up. The concept is that the transmission speed is such that when all the communications both visual and audio arrive at the server at the same time, there is a handshaking among all the different frequencies to arrive at the same time so that there is no delay and therefore, it is possible to communicate both through audio and through video synchronously through a group so that they can produce things together such as videos, audio, sound tracks, etc. The clients will adjust the latencies of each other's clients' stream so that they become synchronized. This can be achieved by adding latency to the streams which are closer until they match the latency of far away streams. The synchronized streams can then be mixed into one and fed back to each of the clients, who will then hear fellow jammers playing in unison. Accordingly, one example of a use of this would be to record a sound track where all the signals must be simultaneously and synchronously received and transmitted.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
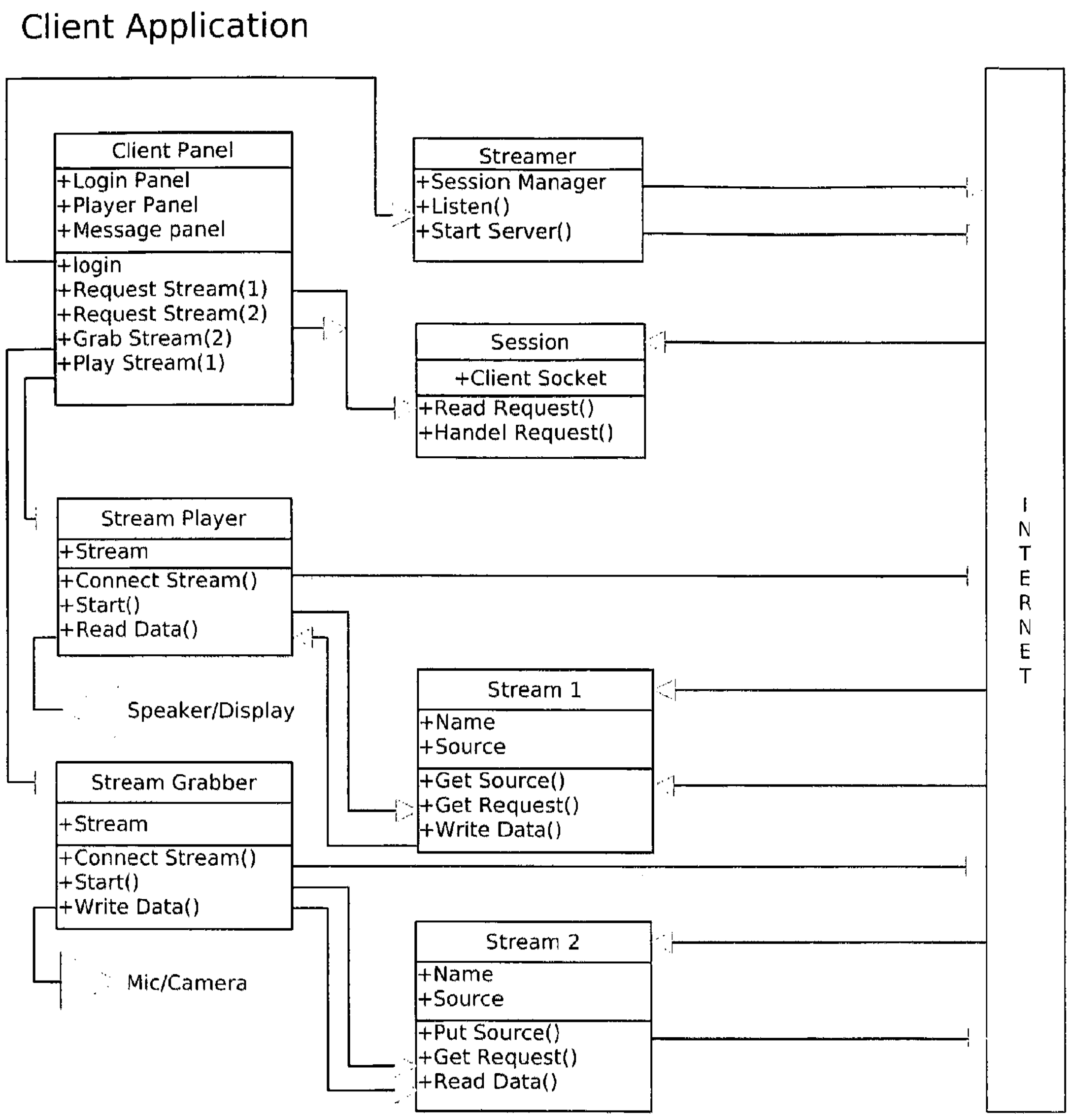
FIG. 1 is a block diagram of one example of software which is used to run the present invention client side.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention. Embodiments of the invention will consist of the following components:

1. A session server to which participants may connect and join in sessions with other participants, and which will provide the Master Metronome time reference to be used by the participants;

2. A client application used to connect a participant to the session server and to the other participants, and which will synchronize its metronome with the Master Metronome;

3. A mechanism by which the client application of a participant will acquire the Master Metronome time from the server, which is to be in sync with the metronomes of all other participants; and 4. A mechanism by which the streams of participants will be delayed until they are in sync with the streams of the furthest participant.

The following scenario illustrates the mechanism of the invention: A musician in New York named Tony wants to play music with his friends Willy in Austin and Candi in Los Angeles over the Internet. Tony connects to the session server and requests to join a session. Similarly, Willy and Candi connect and request to join the same session. The server sends a time stamp to the master application and then to each participant in the session along with each client's authentication information. The client application will calculate the server's reference time based on the time stamp it receives, factoring in round-trip delay time between each client in the session.

One of the participants will be elected leader of the session and he or she will start a reference metronome. The reference metronome will be synchronized to the time reference of the server (the Master Metronome) so that it will beat simultaneously for all the participants of the session. The participants will then play their music in sync with this reference metronome.

Once the reference metronome is started, the client application of each participant will connect to all the other clients in the session and determine their latencies. All metronomes are constantly adjusted to changing network conditions via NTP. It will then synchronize their multimedia streams by delaying each stream according to its latency. This, in effect, will define a new metronome, the Delayed Metronome, which is slightly delayed in comparison with the Master Metronome. In Tony's case, Willy's streams will be delayed until Candi's streams have had a chance to cover the distance from LA to Austin. At that point, Willy's and Candi's streams will be in unison in New York, and they will be in time with the Delayed Metronome. In order to keep up, Tony must play in time with the Master Metronome, although he will hear the music in time with the Delayed Metronome. This brings the audio tracks into unison.

The above is set forth in the block diagram of the software of the present invention as set forth in FIG. 1-4.

FIG. 1 shows the following:

a.) The Client application logs into the streamer. The Session manager gets authentication from the database of users via ssh. The Streamer initializes the session.

The session is sent back to the client application requesting a stream from other clients. The client application starts a stream of audio and video. The Stream Grabber acquires both its own stream and other streams assigned by the session manager and sends them to the player. The Grabber also acquires both video and audio from the local machine.

Figure 2:
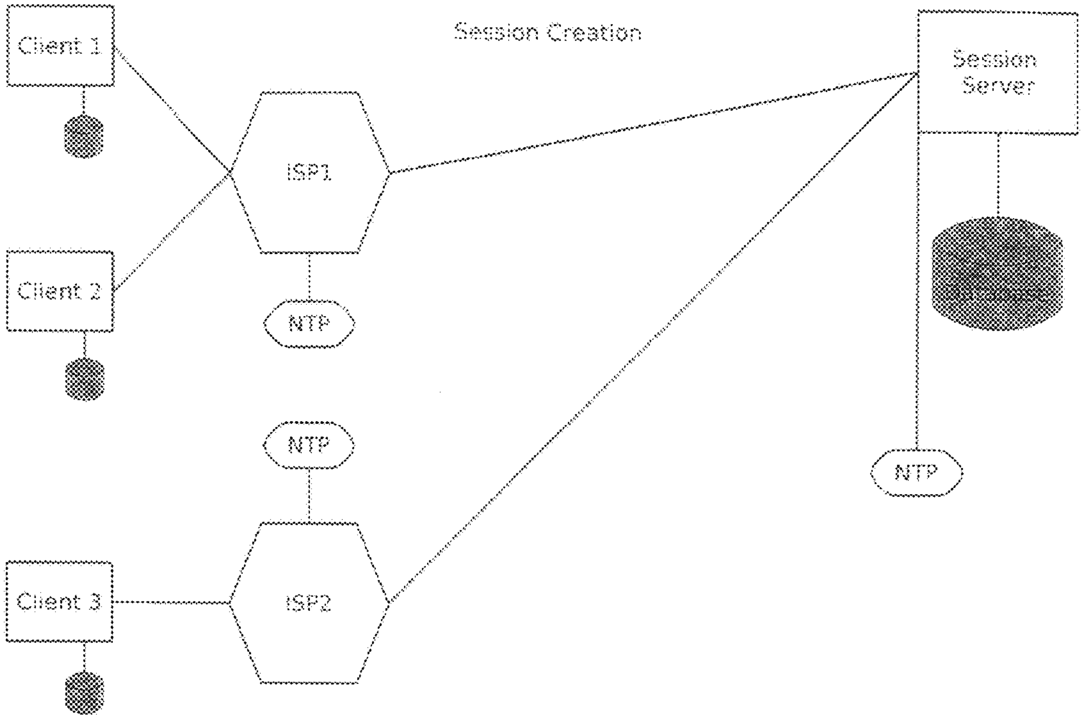
FIG. 2 is a block diagram of a session being created.

FIG. 2 shows the following:

The Stream Server listens for the Client Streamers. The Stream Manager adds the session to the list The Session manager starts the session in each client. The stream manager starts the streams in the client. The streams send session information back to the database.

Figure 3:
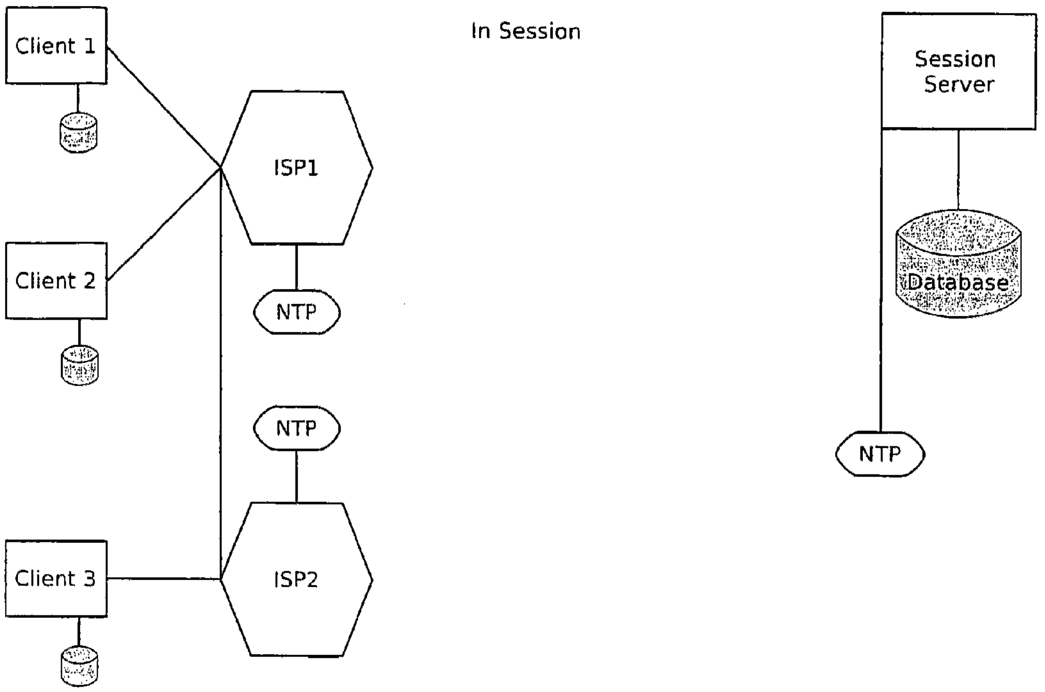
FIG. 3 is a block diagram of a session in progress.

FIG. 3 shows the following:

The client is connected to their internet service providers. Through the clients connection a local NTP server is contacted and used as a local time reference. Also the clients connect to the session server to join or create a session. The session server, through its connection to the Internet uses a local NTP server as it's local time reference. The session server connects directly to the database for session information.

Figure 4:
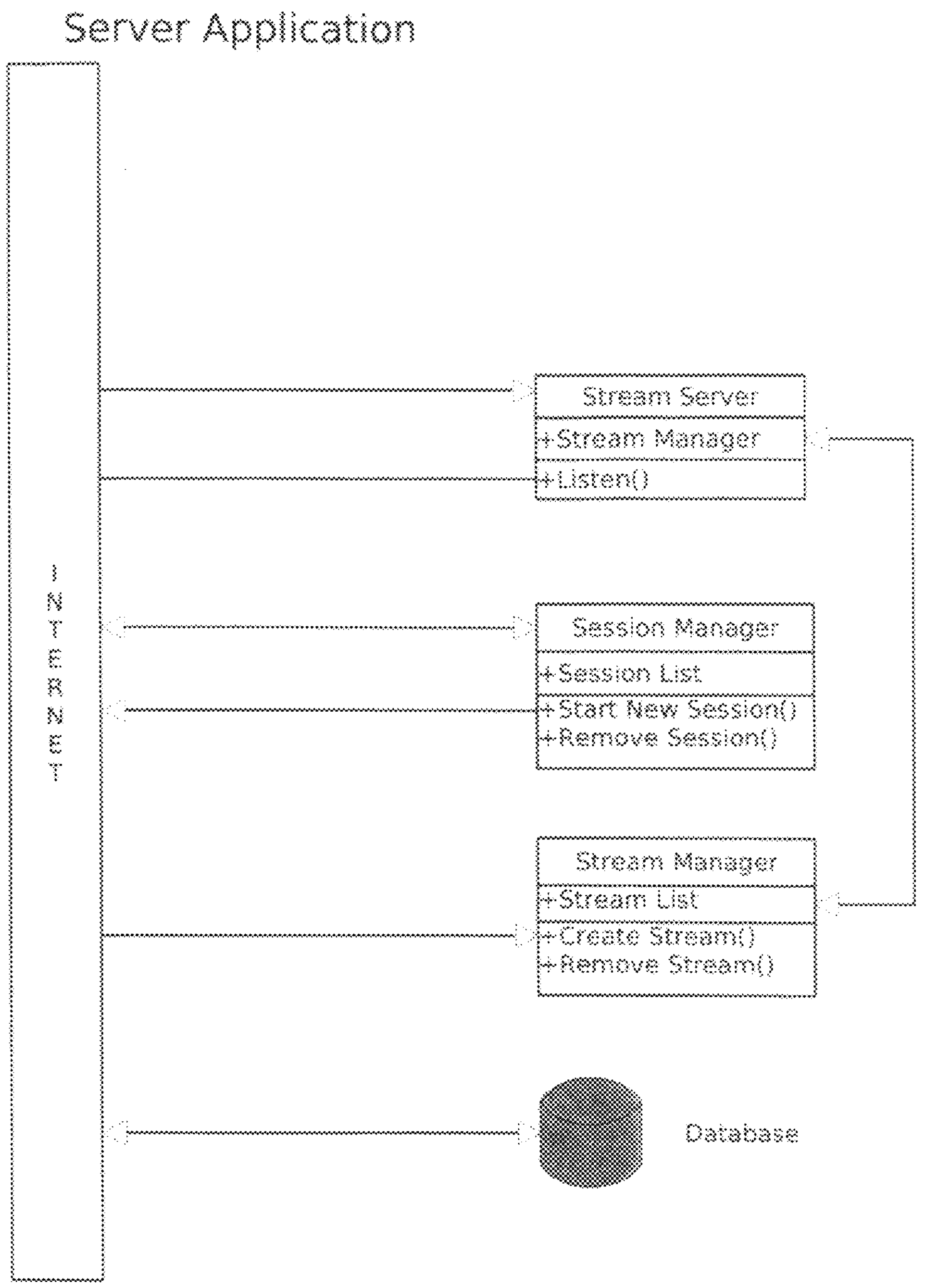
FIG. 4 is a block diagram of server authentication.

FIG. 4 shows the following;

Once the session is established the clients connect their streams with each other through their respective Internet providers. The clients also maintain a connection with their respective local NTP servers. The session server waits for any control data to be sent from any of the clients.

The key aspects of the invention are the mechanisms for synchronizing the metronomes of all participants and the mechanism by which the streams of participants will be delayed until they are in sync with the streams of the furthest participant. The first key aspect is achieved using the standard Network Time Protocol (NTP). NTP is an Internet draft standard, formalized in RFC 958, 1305, and 2030, that provides precise and accurate synchronization of system clocks in computers all around the world. Once clocks are synchronized with NTP, their precision is typically better than 50 milliseconds. The precision of the clocks can be increased by increasing the frequency of the polling of the NTP server. By adjusting the frequency, the invention achieves a precision better than 10 milliseconds.

The second key aspect of the invention is achieved using time stamps embedded within the transmitted streams. In the capture and streaming process, the audio and video data are digitized and then parceled out into packets. The packets are then transmitted in a stream over the Internet using the Real Time Protocol (RTP) over Peer to Peer (P2P). At intervals during the streaming process, the time stamp of the Master Metronome is encoded within the RTP stream packets.

When the receiver receives the packets, it decodes the time stamp from them and compares it with the time stamp of the Master Metronome. For each participant's stream, a record is kept of the difference in time of the time stamp from the Master Metronome. The stream with the highest difference, or latency, is designated as the Delay Reference Stream. The time stamp from the Delay Reference Stream is then used as the reference time for a second metronome, the Delayed Metronome.

Once the Delay Reference Stream has been determined, its data is immediately decoded and rendered to the participant. Other incoming streams are decoded, and then "paused" (buffered) until their time stamp agrees with the Delayed Metronome. Only then are they rendered to the participant. In this fashion, all the incoming streams are made to be in sync with the Delayed Metronome, and therefore, are in unison with one another.

The music heard by each participant will be synchronized to the Delayed Metronome, so the participants will stay on beat. The latency due to digitization and packetization will be minimized. The network latency should be less than 500 milliseconds. In the dynamically changing environment of the Internet, NTP is used to adjust for changing latencies, like a person changing seats in the audience. Performers in large orchestras typically experience latencies of this magnitude in hearing instruments on the other side of the stage, due to the comparatively slow speed of sound. They have to play to their reference metronome, which is the conductor. The invention, then, will allow online musicians to have an experience similar to what they would have if they were playing together in a large auditorium.

Defined in detail, the present invention is a means for providing synchronous delivery and playback of three or more electronic audio or video files, having differing arrival latencies, from participants from multiple locations, during an on-line session, the synchronous delivery and playback means comprising: (a) a session server having a master metronome; the master metronome used as a time reference by all participants; (b) a client application, the client application connecting a participant to the session server and to other participants and having a client metronome and utilizing a formalized Internet time standard, the Internet time standard being the Network Time Protocol (NTP), the client metronome is synchronized with the master metronome; (c) a timing mechanism, the timing mechanism synchronizing the client metronome in the client application of the other participants; and (d) a file, calibrating mechanism, the file calibrating mechanism having a buffer, a mixer, and a delayed metronome, the buffer having a means for analyzing the difference in arrival latencies of files by all participants, and a means for synchronizing the files, by which the arrival latency of any participant's file may be increased so that all files by all participants arrive at the same time, and the mixer compiling the synchronized files into one file which is then returned to the participants, and the delayed metronome being the timing means of the files after the files have been synchronized.

Defined more broadly, the present invention is an apparatus to provide synchronous delivery and playback of three or more electronic audio or video files, having differing arrival latencies, from participants from multiple locations, during an on-line session, the synchronous delivery and playback apparatus comprising: (a) a session server having a master metronome; the master metronome used as a time reference by all participants; (b) a client application, the client application connecting a participant to the session server and to other participants and having a client metronome, the client metronome is synchronized with the master metronome; (c) a timing mechanism, the timing mechanism synchronizing the client metronome in the client application of the other participants; and (d) a file calibrating mechanism, the file calibrating mechanism having a buffer, the buffer having a means for analyzing the difference in arrival latencies of files by all participants, and a means for synchronizing the files, by which the arrival latency of any participant's file may be increased so that all files by all participants arrive at the same time.

Defined alternatively in detail, the present invention is a method to provide synchronous delivery and playback of three or more electronic audio or video files, having differing arrival latencies, from participants from multiple locations, during an on-line session, the synchronous delivery and playback method comprising: (a) creating a session on a server; (b) allowing participants to request to join the session; (c) approving or denying the participant's request to join the session; (d) only after approval, joining the participant to the session and time stamping the participant's session; (e) enabling a client application, the client application calculating the server's reference time and factoring in a delay time; (f) starting a reference metronome, the reference metronome synchronized to the time reference stamp of the server and is given simultaneously to all participants; (g) connection by the client application of each participant to the client application of the other participants and determination of each participant's time differentials; (h) adjusting constantly of the reference metronome to the changes in the network conditions; (i) buffering and synchronizing the participants' multimedia streams so that all streams are transmitted so as to arrive at the same time as the slowest stream; (j) creating a delayed metronome, the delayed metronome in time with the buffered and synchronized multimedia stream; (k) utilizing the embedded time stamp within the transmitted streams to determine which stream has the greatest latency as compared to the reference metronome; (l) decoding all streams as they arrive at the server; (m) designating the stream with the greatest latency as the delay reference stream; (n) buffering all other streams until each stream's time stamp matches that of the delay reference stream; and (o) rendering the all outgoing streams to all participants such that the participant with the least latency receives its stream at the same time as the participant with the greatest latency.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method for providing synchronous delivery and playback of three or more electronic audio or video files, having differing arrival latencies, from participants from multiple locations, during an on-line session, the synchronous delivery and playback means comprising:

a. a session server having a master timestamp, said master timestamp used as a time reference by all participants;

b. a client application, said client application connecting a participant to the session server and to other participants and having a client timestamp and utilizing a formalized Internet time standard, said Internet time standard being the Network Time Protocol (NTP) which is used as the predictive successive approximation of the time of day for the client and the server, said client and server timestamp is synchronized with the master timestamp;

c. a timing mechanism, said timing mechanism synchronizing the client timestamp in the client application of the other participants and increasing the frequency of polling of the NTP so that the master timestamp and all client timestamps are synchronized to a precision of at least 10 milliseconds;

d. a file calibrating mechanism, said file calibrating mechanism having a buffer, a mixer, and a delayed timestamp, said buffer having a means for analyzing the difference in arrival latencies in real time of files by all participants, and a means for synchronizing the files, by which the arrival latency of any participant's file may be increased so that all files by all participants arrive at the same time, and said mixer compiling the synchronized files into multiple files which are then returned to the participants, and said delayed timestamp being the timing means of the files after the files have been synchronized;

e. respective receivers at each client and the session server receiving packets of information from each client, the receiver decoding the timestamp from each client and comparing it with the timestamp of the master timestamp, keeping a record for each client of the difference in time of the time stream from the master timestamp, the stream with the highest difference designated as the delay reference stream and the timestamp from the delay reference stream is used as a reference time delayed timestamp; and f. once the delayed reference stream has been determined, its data is immediately decoded and rendered to the client having the delayed reference stream, other incoming streams are then decoded and then paused until their timestamp agrees with the delayed timestamp and only then are they rendered to the client having that respective stream so that all incoming streams are in sync with the delayed timestamp and are therefore in unison with one another.

2. The synchronous delivery and playback means in accordance with claim 1, wherein said synchronous delivery and playback means further comprises a reference timestamp, said reference timestamp controlled by one of the participants, and constantly monitoring the NTP so as to continuously adjust the timing conditions.

3. An apparatus to provide synchronous delivery and playback of three or more electronic audio or video files, having differing arrival latencies, from participants from multiple locations, during an on-line session, the synchronous delivery and playback apparatus comprising:

a. a session server having a master timestamp, said master timestamp used as a time reference by all participants;

b. a client application, said client application connecting a participant to the session server and to other participants and having a client timestamp, and utilizing a formalized Internet time standard, said Internet time standard being the Network Time Protocol (NTP) which is used as the predictive successive approximation of the time of day for the client and the server, said client timestamp is synchronized with the master timestamp;

c. a timing mechanism, said timing mechanism synchronizing the client timestamp in the client application of the other participants and increasing the frequency of polling of the NTP so that the master timestamp and all client timestamps are synchronized to a precision of at least 10 milliseconds;

d. a file calibrating mechanism, said file calibrating mechanism having a buffer, said buffer having a means for analyzing the difference in arrival latencies in real time of files by all participants, and a means for synchronizing the files, by which the arrival latency of any participant's file may be increased so that all files by all participants arrive at the same time;

e. a receiver at the session server receiving packets of information from each client, the receiver decoding the timestamp from each client and comparing it with the timestamp of the master timestamp, keeping a record for each client of the difference in time of the time stream from the master timestamp, the stream with the highest difference designated as the delay reference stream and the timestamp from the delay reference stream is used as a reference time delayed timestamp; and f. once the delayed reference stream has been determined, its data is immediately decoded and rendered to the client having the delayed reference stream, other incoming streams are then decoded and then paused until their timestamp agrees with the delayed timestamp and only then are they rendered to the client having that respective stream so that all incoming streams are in sync with the delayed timestamp and are therefore in unison with one another.

4. The synchronous delivery and playback apparatus in accordance with claim 3, wherein said file calibrating mechanism further mixes the synchronized files into one file which is then returned to the participants.

5. The synchronous delivery and playback apparatus in accordance with claim 3, wherein said file calibrating mechanism further mixes the synchronized files into one file which is then returned simultaneously to the participants.

6. The synchronous delivery and playback apparatus in accordance with claim 3, wherein said synchronous delivery and playback means further comprises a reference timestamp, said reference timestamp controlled by one of the participants, and constantly monitoring the NTP so as to continuously adjust the timing conditions.

7. The synchronous delivery and playback apparatus in accordance with claim 3, wherein said file calibrating mechanism further comprises a delayed timestamp, said delayed timestamp being the timing of the files after the files have been synchronized.

8. A method to provide synchronous delivery and playback of three or more electronic audio or video files, having differing arrival latencies, from participants from multiple locations, during an on-line session, the synchronous delivery and playback method comprising:

a. creating a session on a server;

b. allowing participants to request to join the session;

c. approving or denying the participant's request to join the session;

d. only after approval, joining the participant to the session and timestamping the participant's session, and utilizing a formalized Internet time standard, said Internet time standard being the Network Time Protocol (NTP) which is used as the predictive successive approximation of the time of for the client and the server;

e. enabling a client application, said client application calculating each respective client's and server's reference time and factoring in a delay time;

f. starting a reference timestamp, said reference timestamp synchronized to the time reference of the server and is given simultaneously to all participants, increasing the polling of the NTP so that the master timestamp and all participant timestamps are synchronized to a precision of at least 10 milliseconds;

g. connection by the client application of each participant to the client application of the other participants and determination of each participant's time differentials in real time;

h. adjusting constantly of the reference timestamp to the changes in the network conditions;

i. buffering and synchronizing the participants' multimedia streams so that all streams are transmitted so as to arrive at the same time as the slowest stream;

j. creating a delayed timestamp, said delayed timestamp in time with the buffered and synchronized multimedia stream;

k. utilizing the embedded timestamping within the transmitted streams to determine which stream has the greatest latency as compared to the reference timestamp;

l. decoding all streams as they arrive at the server;

m. designating the stream with the greatest latency as the delay reference stream;

n. buffering all other streams until each stream's timestamp matches that of the delay reference stream;

o. rendering the all outgoing streams to all participants such that the participant with the least latency receives its stream at the same time as the participant with the greatest latency;

p. a receiver at the session server receiving packets of information from each client, the receiver decoding the timestamp from each client and comparing it with the timestamp of the master timestamp, keeping a record for each client of the difference in time of the time stream from the master timestamp, the stream with the highest difference designated as the delay reference stream and the timestamp from the delay reference stream is used as a reference time delayed timestamp; and q. once the delayed reference stream has been determined, its data is immediately decoded and rendered to the client having the delayed reference stream, other incoming streams are then decoded and then paused until their timestamp agrees with the delayed timestamp and only then are they rendered to the client having that respective stream so that all incoming streams are in sync with the delayed timestamp and are therefore in unison with one another.

9. The synchronous delivery and playback method in accordance with claim 8, wherein said synchronous delivery and playback method further mixing the synchronized files into one file which is then returned to the participants.

10. The synchronous delivery and playback method in accordance with claim 8, wherein said synchronous delivery and playback method further comprises mixing the synchronized files into one file which is then returned simultaneously to the participants.

11. The synchronous delivery and playback method in accordance with claim 8, wherein said synchronous delivery and playback method utilizes a formalized Internet time standard, said Internet time standard being the Network Time Protocol (NTP).

12. The synchronous delivery and playback method in accordance with claim 8, wherein said synchronous delivery and playback method further comprising a reference timestamp, said reference timestamp controlled by one of the participants, and constantly monitoring the NTP so as to continuously adjust the timing conditions.

* * * * *